(12) United States Patent
Gune et al.

(10) Patent No.: US 9,722,959 B2
(45) Date of Patent: Aug. 1, 2017

(54) ASSOCIATING PRIVATE ANNOTATIONS WITH PUBLIC PROFILES

(71) Applicant: LinkedIn Corporation, Mountain View, CA (US)

(72) Inventors: Prasad Kamalakar Gune, Fremont, CA (US); Annabel Fang Liu, Los Altos, CA (US); Pierre Yannick Monestie, Half Moon Bay, CA (US); Alex Martin Bain, Mountain View, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 187 days.

(21) Appl. No.: 14/559,773

(22) Filed: Dec. 3, 2014

(65) Prior Publication Data

US 2015/0249628 A1    Sep. 3, 2015

Related U.S. Application Data

(60) Provisional application No. 61/946,594, filed on Feb. 28, 2014.

(51) Int. Cl.
| | |
|---|---|
| *H04L 12/58* | (2006.01) |
| *G06F 17/30* | (2006.01) |
| *G06Q 10/10* | (2012.01) |

(52) U.S. Cl.
CPC ............. *H04L 51/08* (2013.01); *H04L 51/32* (2013.01); *G06F 17/3002* (2013.01); *G06Q 10/10* (2013.01)

(58) Field of Classification Search
CPC ....... H04L 51/00–51/38; H04L 63/10–63/105; G06F 17/3002–17/30038
See application file for complete search history.

(56) References Cited

U.S. PATENT DOCUMENTS

| | | | | |
|---|---|---|---|---|
| 2010/0312713 | A1* | 12/2010 | Keltner ................. | G06Q 10/10 705/317 |
| 2012/0089690 | A1* | 4/2012 | Hein ...................... | G06Q 10/10 709/206 |
| 2013/0089243 | A1* | 4/2013 | Sauve ............... | G06F 17/30038 382/118 |
| 2013/0097522 | A1* | 4/2013 | Devries ............. | G06F 17/30905 715/745 |
| 2014/0007255 | A1* | 1/2014 | Altaf ................... | G06F 21/6245 726/27 |

(Continued)

*Primary Examiner* — Nicholas Taylor
*Assistant Examiner* — Clayton R Williams
(74) *Attorney, Agent, or Firm* — Schwegman Lundberg & Woessner, P.A.

(57) ABSTRACT

A method of storing data items included in an email message for access by a user in conjunction with an accessing by the user of a profile of a member of the social-networking system is disclosed. An email message from an additional user of a social-networking system is received by the user of the social-networking system. A data item included in the email message is identified upon which a correspondence between the data item included in the email message and a profile of a member of the social-networking system may be determined. An additional data item included in the email message is stored such that the additional data item is accessible by the user of the social-networking system in conjunction with an accessing by the user of the profile of the member.

14 Claims, 14 Drawing Sheets

(56) References Cited

U.S. PATENT DOCUMENTS

2014/0280932 A1* 9/2014 Braun ................ H04L 63/10
  709/225
2015/0081784 A1* 3/2015 Ng .................... G06Q 50/01
  709/204

* cited by examiner

─ 700

Subject: Save time: email resumes to Recruiter
From: LinkedIn Recruiter Importer [resumes@linkedin.com]
To: Robin Hunter [robin.hunter@enigmacorp.com]

Linked in® Recruiter   Talent Pipeline

Add people without leaving your inbox

You can mail a resume (DOC or PDF format) to resumes@linkedin.com to add this person to your Talent Pipeline. If a candidate has mailed you the resume, simply forward it to this address.

When you send the message, you can include a response to the candidate to be sent and tracked from Talent Pipeline

[ Go to Recruiter ]

You are receiving LinkedIn Recruiter emails. Change your email settings.

This email was intended for Robin Hunter (Recruiting Specialist at Enigma Corporation). Learn how this information helps us protect your security. © 2012. LinkedIn Corporation. 2029 Stierlin Ct., Mountain View, CA 94043, USA

*FIG. 7*

① Subject: Thanks for talking with me!:
From: Aneed Ajab [aneed1@gmail.com]
To: LinkedIn Recruiter Imported [resumes@linkedin.com]
Attachments: aneed_ajab_resume.doc (452 KB)

Hi Robin! It w
I am very inte

Aneed Ajab

② To: resumes@linked.com
Cc:
Subject: FW: Thanks for talking with me!
Attachments: aneed_ajab_resume.doc (452 KB)

On 1/6/12 2:42 PM, "Aneed Ajab" <aneed1@gmail.com> wrote:

Hi Robin! It was nice to talk with you at my university's career fair on Monday.

I am very interested in working at Enigma Corporation. Here's my resume.

Aneed Ajab

*FIG. 8*

Subject: Could not import aneed_ajab_resume.doc
From: LinkedIn Recruiter Importer [resumes@linkedin.com]
To: Robin Hunter [robin.hunter@enigmacorp.com]
Attachments: aneed_ajab_resume.doc (452 KB)

Linked in® Recruiter    Talent Pipeline

We're having trouble reading this file

We can't seem to read aneed_ajab_resume.doc to determine whose resume it is. Maybe the file format isn't a PDF or DOC, maybe there isn't any text in it, or maybe a bolt struck out of the blue. Who knows?

There's still hope. You can add a new profile in Talent Pipeline to track this person, and if you want to keep the original file around, add it as additional info.

[ Add a profile ]

Original message for Aneed_ajab_resume.doc

> On 1/6/12 2:42 PM, "Aneed Ajab" <aneed1@gmail.com> wrote:
>
> Hi Robin! It was nice to talk with you at my university's career fair on Monday.
>
> I am very interested in working at Enigma Corporation. Here's my resume.
>
> ...............
>
> Aneed Ajab You are receiving LinkedIn Recruiter emails. Change your email settings.

This email was intended for Robin Hunter (Recruiting Specialist at Enigma Corporation). Learn how this information helps us protect your security. © 2012. LinkedIn Corporation. 2029 Stierlin Ct., Mountain View, CA 94043, USA

*FIG. 10*

Modifications for multi-resume   *highlighted in orange*

Subject:   Could not import   4 people

Attachments:   (include only the attachments that failed)

---

We're having trouble reading these files

We can't seem to these 4 files to determine who they are. Maybe the file format isn't a PDF or DOC, maybe there isn't any text in it, or maybe a bolt struck out of the blue. Who knows?

There's still hope. You can add a new profile in Talent Pipeline to track each person, and if you want to keep the original file around, add it as additional info.

[ Add a profile ]

---

Original message for these 4 people aneed_ajab_resume.doc, charlesnorris.pdf, dwayne_johnson.doc, randall-savage-2011.pdf > On 1/6/12 2:42 PM, "Hiram Reeves" <hiram.reeves@enigmacorp.com> wrote:
>
> Just got a handful of resumes--can you follow up with them and see if we should

*FIG. 11*

Subject: Choose a contract for aneed_ajab_resume.doc
From: LinkedIn Recruiter Importer [resumes@linkedin.com]
To: Robin Hunter [robin.hunter@enigmacorp.com]

Linked in® Recruiter  Talent Pipeline

Which contract did you mean?
We want to ensure that aneed_ajab_resume.doc is added to the right contract. In the future, you can import people to any contract directly using the email addresses shown below.

| Enigma Corporation | enigma corporation.resumes@linkedinn.com |
| Enigma C-Level | enigma c-level.resumes@linkedinn.com |
| Hunter Enterprises | hunter_enterprises.resumes@linkedinn.com |

Original message for Aneed_ajab_resume.doc

On 1/6/12 2:42 PM, "Aneed Ajab" <aneed1@gmail.com> wrote:

Hi Robin! It was nice to talk with you at my university's career fair on Monday.

I am very interested in working at Enigma Corporation. Here's my resume.

............
Aneed Ajab

You are receiving LinkedIn Recruiter emails. Change your email settings.
This email was intended for Robin Hunter (Recruiting Specialist at Enigma Corporation). Learn how this information helps us protect your security. © 2012. LinkedIn Corporation. 2029 Sterlin Ct., Mountain View, CA 94043, USA

*FIG. 12*

Modifications for multi-resume *highlighted in orange*

Subject: Choose a contract for these 4 people to import

---

What contract did you mean?

We want to ensure that these 4 people are added to the right contract.
In the future, you can import people to any contract directly using the email addresses shown below.

---

Original message for these 4 people
aneed_ajab_resume.doc, charlesnorris.pdf, dwayne_johnson.doc, randall-savage-2011.pdf On 1/6/12 2:42 PM, "Hiram Reeves" <hiram.reeves@enigmacorp.com> wrote:

Just got a handful of resumes--can you follow up with them and see if we should

*FIG. 13*

ASSOCIATING PRIVATE ANNOTATIONS WITH PUBLIC PROFILES

CROSS-REFERENCE TO RELATED APPLICATIONS

This application claims the benefit of U.S. Provisional Application No. 61/946,594, filed Feb. 28, 2014, entitled "ASSOCIATING PRIVATE ANNOTATIONS WITH PUBLIC PROFILES," which is incorporated herein by reference in its entirety.

TECHNICAL FIELD

This application relates generally to the technical field of online social networking, and, in one specific example, to allowing job recruiters to generate private annotations based on content included in an e-mail message and associate the private annotations with profiles of potential job candidates maintained with respect to an online social networking system.

BACKGROUND

Job recruiters may use various features of social networking systems to find potential candidates for job openings that the recruiter seeks to fill.

BRIEF DESCRIPTION OF THE DRAWINGS

Some embodiments are illustrated by way of example and not limitation in the figures of the accompanying drawings in which:

FIG. 7 is a line drawing illustrating an example user interface for notifying a user of the option to use the email importing feature;

FIG. 8 is a line drawing illustrating an example user interface for allowing a user to forward an email message to a predetermined email address to trigger an importing of data items included in the email message;

FIG. 10 is a line drawing illustrating an example user interface for notifying the sender that an email message was not successfully parsed and imported;

FIG. 11 is a line drawing illustrating an example user interface for notifying the sender that one or more of multiple data items were not successfully processed;

FIG. 12 is a line drawing illustrating an example user interface for prompting the user to select from one of several contracts;

FIG. 13 is a line drawing illustrating an example user interface for prompting the user to select from one of several contracts for each of multiple data items included in the email message;

DETAILED DESCRIPTION

In the following description, for purposes of explanation numerous specific details are set forth in order to provide an understanding of various embodiments of the inventive subject matter. It will be evident, however, to those skilled in the art that embodiments may be practiced without these specific details. Further, to avoid obscuring the inventive concepts in unnecessary detail, well-known instruction instances, protocols, structures, and techniques have not been shown in detail.

In various embodiments, a method is disclosed for storing data items included in an email message for access by a user in conjunction with an accessing by the user of a profile of a member of the social-networking system. An email message from an additional user of a social-networking system is received by the user of the social-networking system. A data item included in the email message is identified upon which a correspondence between the email message and a profile of a member of the social-networking system may be determined. The correspondence between the email message and the profile of the member of the social-networking system is determined based on the data item. An additional data item included in the email message is stored such that the additional data item is accessible by the user of the social-networking system in conjunction with an accessing by the user of the profile of the member.

This method and other methods or embodiments disclosed herein may be implemented as a computer system having one or more modules (e.g., hardware modules or software modules). Such modules may be executed by one or more processors of the computer system. This method and other methods or embodiments disclosed herein may be embodied as instructions stored on a machine-readable medium that, when executed by one or more processors, cause the one or more processors to perform the instructions.

Figure 1:
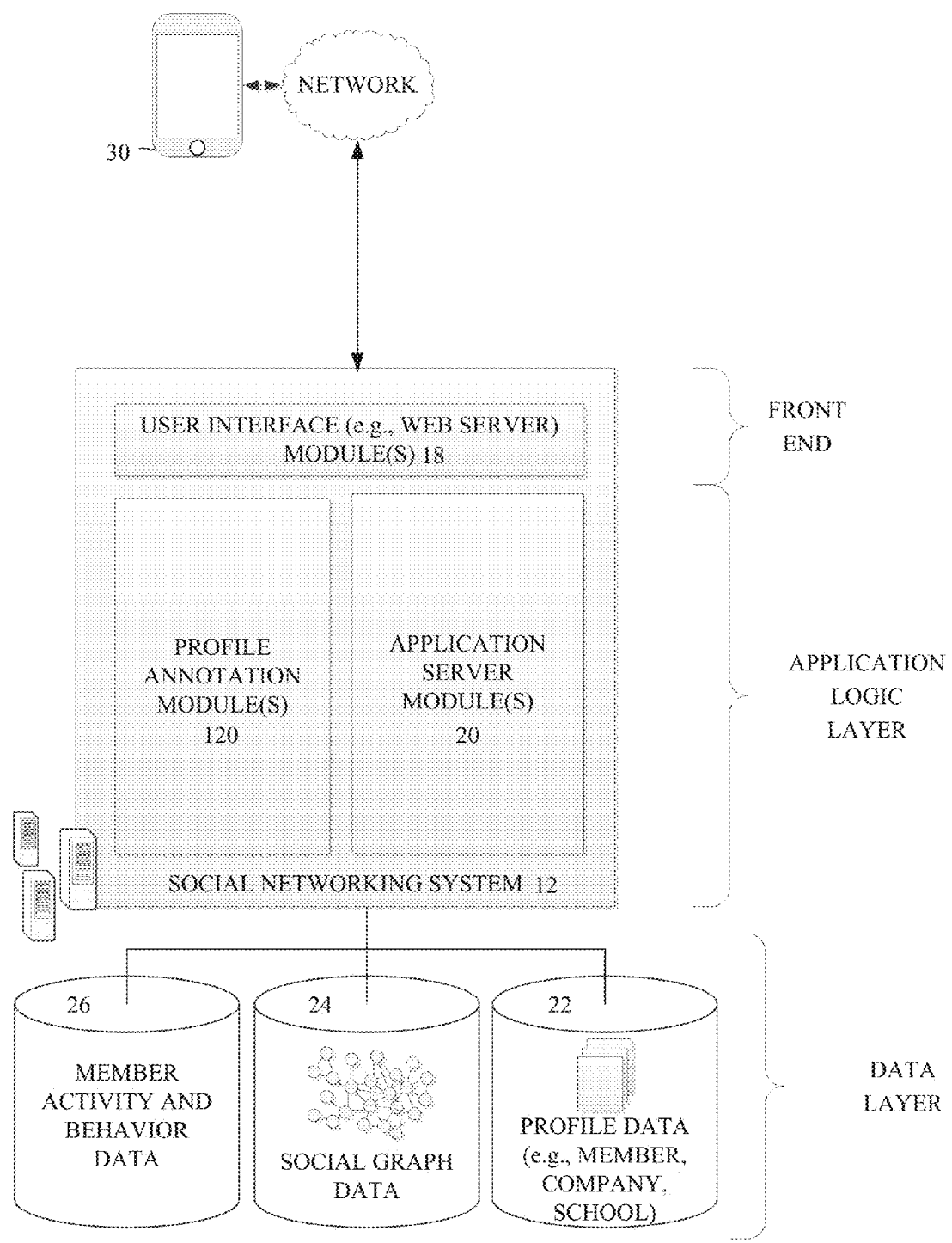
FIG. 1 is a network diagram depicting an example client-server system within which various embodiments may be deployed.

FIG. 1 is a network diagram depicting a server system (e.g., social networking system 12) that includes augmented reality module(s) 120 for responding to requests or commands received from a mobile computing device 30, consistent with some embodiments of the present invention. As described in greater detail below, the augmented reality module(s) 120 may be configured to receive commands or requests from mobile computing devices, such as that with reference number 30 in FIG. 1, process or analyze the commands or requests, and transmit responses to the commands or requests. In various embodiments, the received commands or requests may include various information, such as a member identifier uniquely identifying a member of the social networking service (e.g., corresponding to a user of the mobile computing device 30), location information identifying a member's current location, and so on.

As shown in FIG. 1, the social networking system 12 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module (e.g., a web server) 18, which receives requests from various client-computing devices including one or more mobile computing devices 30, and communicates appropriate responses to the requesting client computing devices. For example, the user interface module(s) 18 may receive requests in the form of Hypertext Transport Protocol (HTTP) requests, or other web-based, application programming interface (API) requests. The client devices may be executing conventional web browser applications, or applications that have been developed for a specific platform to include any of a wide variety of mobile computing devices and mobile-specific operating systems.

As shown in FIG. 1, the data layer includes several databases, including a database 22 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database with reference number 22.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 12, information relating to the member's activity and behavior may be stored in a database, such as the database with reference number 26.

The social networking system 12 may provide a broad range of other applications and services that allow members the opportunity to share and receive information, often customized to the interests of the member. For example, with some embodiments, the social networking system 12 may include a photo sharing application that allows members to upload and share photos with other members. With some embodiments, members of a social networking system 12 may be able to self-organize into groups, or interest groups, organized around a subject matter or topic of interest. With some embodiments, members may subscribe to or join groups affiliated with one or more companies. For instance, with some embodiments, members of the social networking service 12 may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with the social graph data of the database with reference number 24.

The application logic layer includes various application server modules 20, which, in conjunction with the user interface module(s) 12, generates various user interfaces with data retrieved from various data sources or data services in the data layer. With some embodiments, individual application server modules 20 are used to implement the functionality associated with various applications, services and features of the social networking system. For instance, a messaging application, such as an email application, an instant messaging application, or some hybrid or variation of the two, may be implemented with one or more application server modules 20. A photo sharing application may be implemented with one or more application server modules 20. Similarly, a search engine enabling users to search for and browse member profiles may be implemented with one or more application server modules 20. Of course, other applications and services may be separately embodied in their own application server modules 20.

As illustrated in FIG. 1, social networking system 12 includes profile annotation module(s) 120, which are described in more detail below.

Figure 2A:
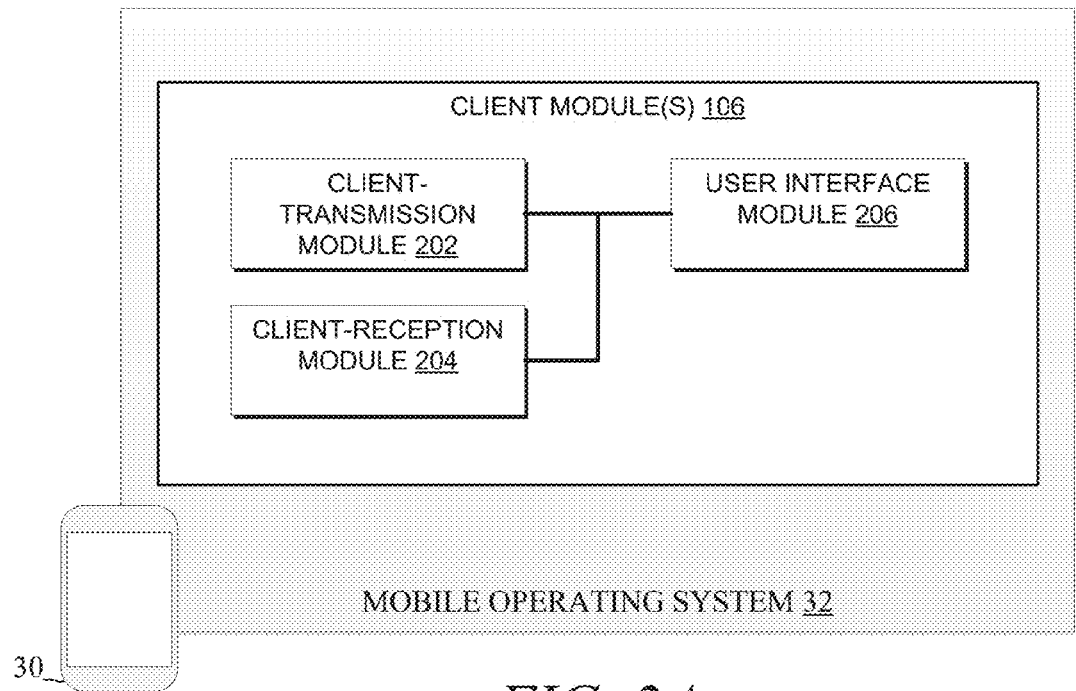
FIG. 2A is a block diagram depicting example client module(s) that may implement various embodiments.

FIG. 2A is a block diagram depicting example client module(s) 106 of a mobile computing device 30, consistent with some embodiments of the invention. As is understood by skilled artisans in the relevant computer- and mobile device-related arts, each module or engine shown in FIG. 2A represents a set of executable software instructions and the corresponding hardware (e.g., memory, processor, sensor devices) for executing the instructions, and deriving or generating relevant data. To avoid obscuring the inventive subject matter with unnecessary detail, various functional modules and engines that are not germane to conveying an understanding of the inventive subject matter have been omitted from FIG. 2A.

As illustrated in FIG. 2A, the mobile computing device 30 includes a mobile operating system 32. The client module(s) 106 include various modules 202-206. A client-transmission module 202 may send communications (e.g., to the profile annotation module(s) 120). A client-reception module 204 may receive communications (e.g., from the profile annotation module(s) 120). A user interface module 206 may present a user interface to a user of the mobile computer device 30, such as any of the user interface modules depicted in FIGS. 7-12.

Figure 2B:
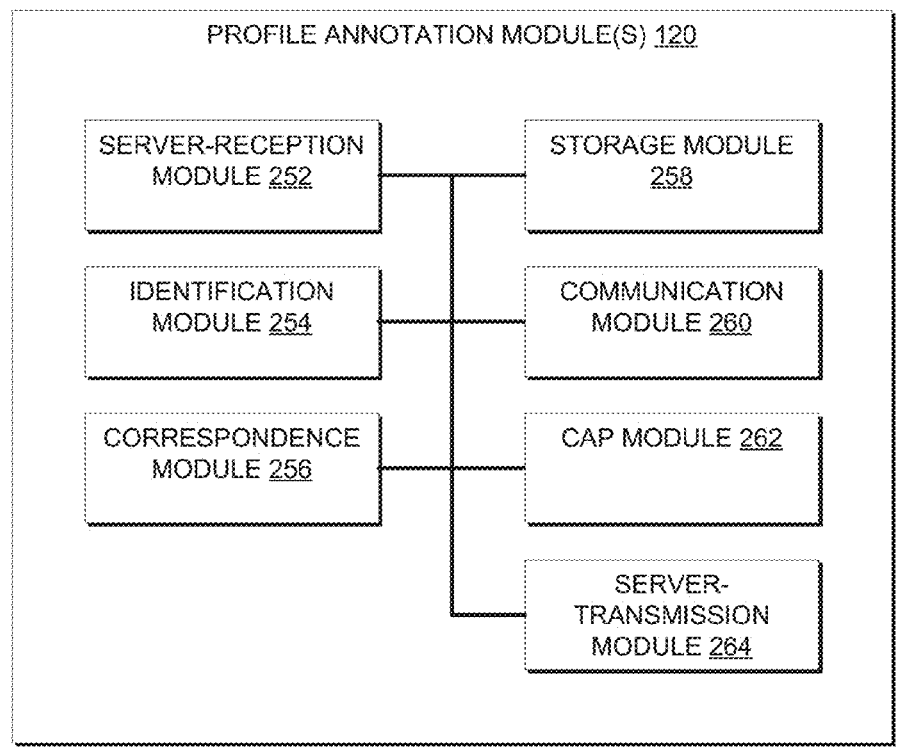
FIG. 2B is a block diagram illustrating example server module(s) that may implement various embodiments.

FIG. 2B is a block diagram illustrating example profile annotation module(s) 120. A server-reception module 252 may be configured to receive communications (e.g., from the mobile computing device 30), such as requests to import an email message, as will be described in more detail below.

An identification module 254 may be configured to identify a data item included in an email message upon which a correspondence between a profile of a member of the social-networking system and the email message may be determined.

A correspondence module 256 may be configured to determine the correspondence between the email message and the profile of the member and based on the data item.

A storage module 258 may be configured to store a data item for private access by the user (e.g., when the user accesses the profile of the member).

A communication module 260 may be configured to handle initial operations for processing an email message containing various data items pertaining to the member.

A CAP (Customer Access Portal) module 262 may be configured to perform further processing pertaining to the email messages, including importing the email messages and sending and processing reply messages.

A server-transmission module 264 may be configured to transmit communications (e.g., to the client module(s) 106), such as communications instructing the client module(s) to display a user interface on the mobile computing device 30.

Although the functionality corresponding to modules 202-212 is depicted and described as being implemented on the client side (e.g., by the client module(s) 106), in various embodiments, some or all of the functionality corresponding to modules 202-212 may be implemented on the server side (e.g., by the profile annotation module(s) 120), and vice versa. Thus, in various embodiments, one or more algorithms implemented on the client side or server side may utilize information collected about the user on the client or server side, such as the member's current activity, current location, past behavior, social/graph data, profile data, and so on.

Figure 3:
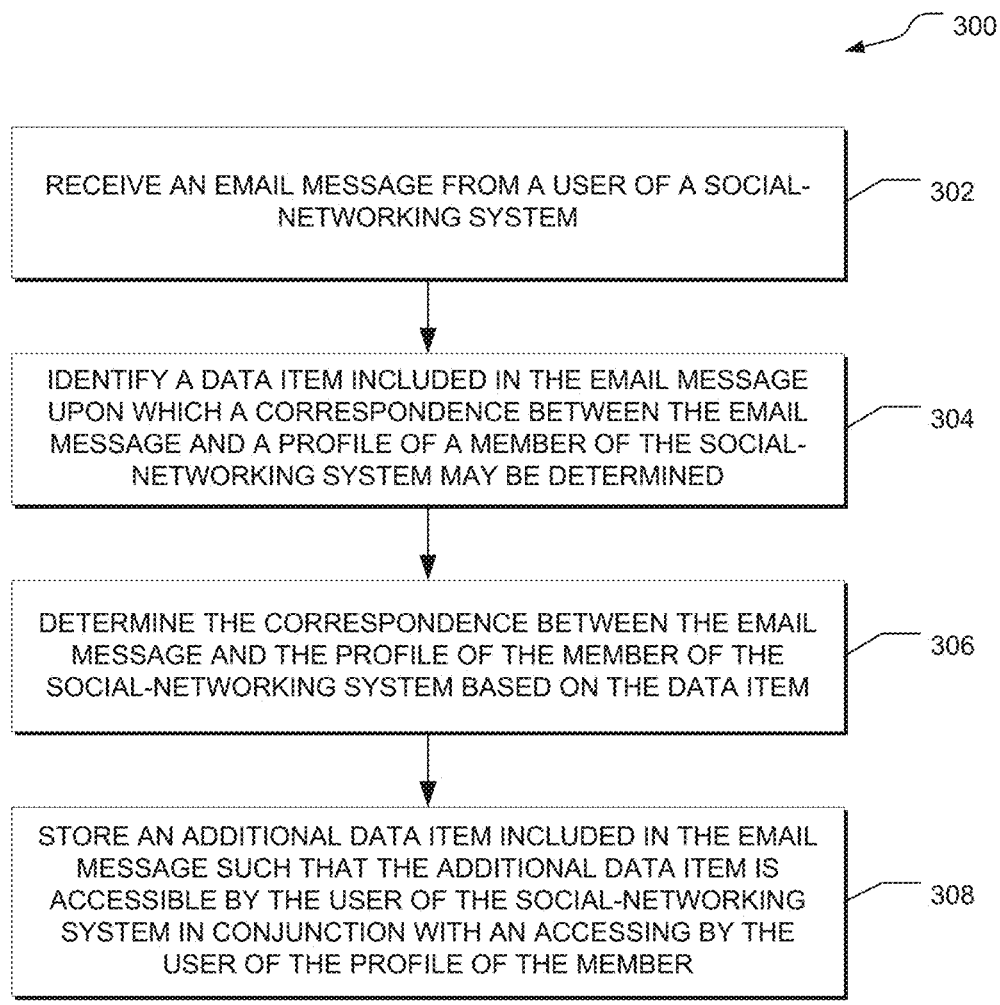
FIG. 3 is a flow chart illustrating example operations of a method of associating private annotations with elements of a profile of a member of an online social-networking system.

FIG. 3 is a flow chart illustrating example operations of a method 300 of associating private annotations with elements of a profile of a member of an online social-networking system. In various embodiments, the method 300 may be implemented by one or more of the modules of FIGS. 2A and 2B.

At operation 302, the server-reception module 252 may receive an email message from a user of a social-networking system. In various embodiments, the user may be a job recruiter, a potential job candidate, a referrer of the potential job candidate, and so on. In various embodiments, the email message may include various data items (e.g., attached to the email message or included in the body or metadata of the email message). Such data items may include, for example, a resume of a potential job candidate, elements included in the resume (e.g., the potential job candidate's name, address, email address, education, employment history, qualifications, and so on), remarks accompanying the resume (e.g., from the potential job candidate, referrer, or job recruiter), metadata (e.g., an originating email address corresponding to the potential job candidate, title, subject line, recipients of the email message, a date the email was sent, tags (described in more detail below) or any other metadata associated with the email message), notes added by a person in the chain of recipients of the email message, and so on. In various embodiments, the data items may have been received by a user in an email message from the potential candidate and subsequently forwarded to the server-reception module 252 as an additional email message (including additional data items) from the user of the social-networking system.

At operation 304, the identification module 254 may identify one of the data items included in the email message as a data item upon which a correspondence between the potential job candidate and a member profile of the potential job candidate may be determined. In various embodiments, the member profile of the potential job candidate may be a profile that is maintained by the potential job candidate with respect to the social-networking system. In various embodiments, the member profile may be a profile that is maintained by a user (e.g., a job recruiter) with respect to the social-networking system independently of any profile that is maintained by the potential job candidate with respect to the social-networking system.

At operation 306, the correspondence module 256 identifies the correspondence between the potential job candidate and the profile of the potential job candidate based on the data item. For example, if the data item selected from the email message received from the user is a name of the potential job candidate, the correspondence module 256 may identify the correspondence between the potential job candidate and the profile of the potential job candidate based on a matching of the name with a name associated with the profile. As another example, if the data item selected is an email address of the potential job candidate, the correspondence module 256 may identify the correspondence based on a matching of the email address with an email address associated with the profile. In various embodiments, a combination of data items included in the email message may be used to perform a fuzzy matching of the potential job candidate to the member profile of the job candidate. For example, if a first name included in the title of the email message and a last name included in a body of the email message correspond to a member profile having the first and last name, it may be determined that there is a correspondence between the potential job candidate and the profile of the potential job candidate. In various embodiments, the user who sent the email message to the server-reception module 252 may be prompted to confirm the identified correspondence (e.g., via a separate communication). In various embodiments, if the correspondence module 256 does not identify an existing profile corresponding to the potential job candidate, the storage module 256 may create a new profile for the potential job candidate.

At operation 308, the storage module 256 may store an additional data item included in the email message such that the additional data item is accessible by the user who sent the email message to the server-reception module 252 in conjunction with an accessing by the user of the profile of the member. For example, the storage module 256 may store any of the data items pertaining to the potential job candidate that were included in the email message and that were determined to be non-duplicative of data items associated with the profile of the potential job candidate. For example, if the email message included an email address for the potential job candidate and the profile corresponding to the potential job candidate does not include an email address for the potential job candidate, the storage module 256 may store the email address for the potential job candidate for accessing by the user in conjunction with an accessing of the profile of the job candidate by the user.

In various embodiments, the additional data item stored by the storage module 256 may be private to the user or other users associated with (or designated by) the user, whereas other data items included in the profile of the potential candidate may be public. For example, if the profile is a public profile maintained by the potential job candidate with respect to the social-networking system, then upon accessing the profile, the recruiter may be presented with an aggregation of public data items included in the profile and private data items stored by the storage module 256. In various embodiments, the private data may be presented to the user as private annotations of the public profile data (e.g., using special designations in a user interface).

For example, if the user is a job recruiter, accessing of the additional data item may be restricted to the job recruiter or associates of the job recruiter (e.g., all or a subset of job recruiters in a particular group having a license to access the social-networking system to view or maintain profiles of potential job candidates). Thus, for example, if the additional data item was an email address of the potential job candidate, the job recruiter may be presented not only with public data included in the profile of the potential job candidate, but also the email address of the potential job candidate, the email address being accessible only to those having rights to access the additional data item.

Thus, in various embodiments, associated job recruiters (e.g., job recruiters having a seat on a same service license, as described in more detail below) may maintain private information they have gathered with respect to a potential candidate and access that information simultaneously with information that is public to other members of the social networking system.

Figure 4:
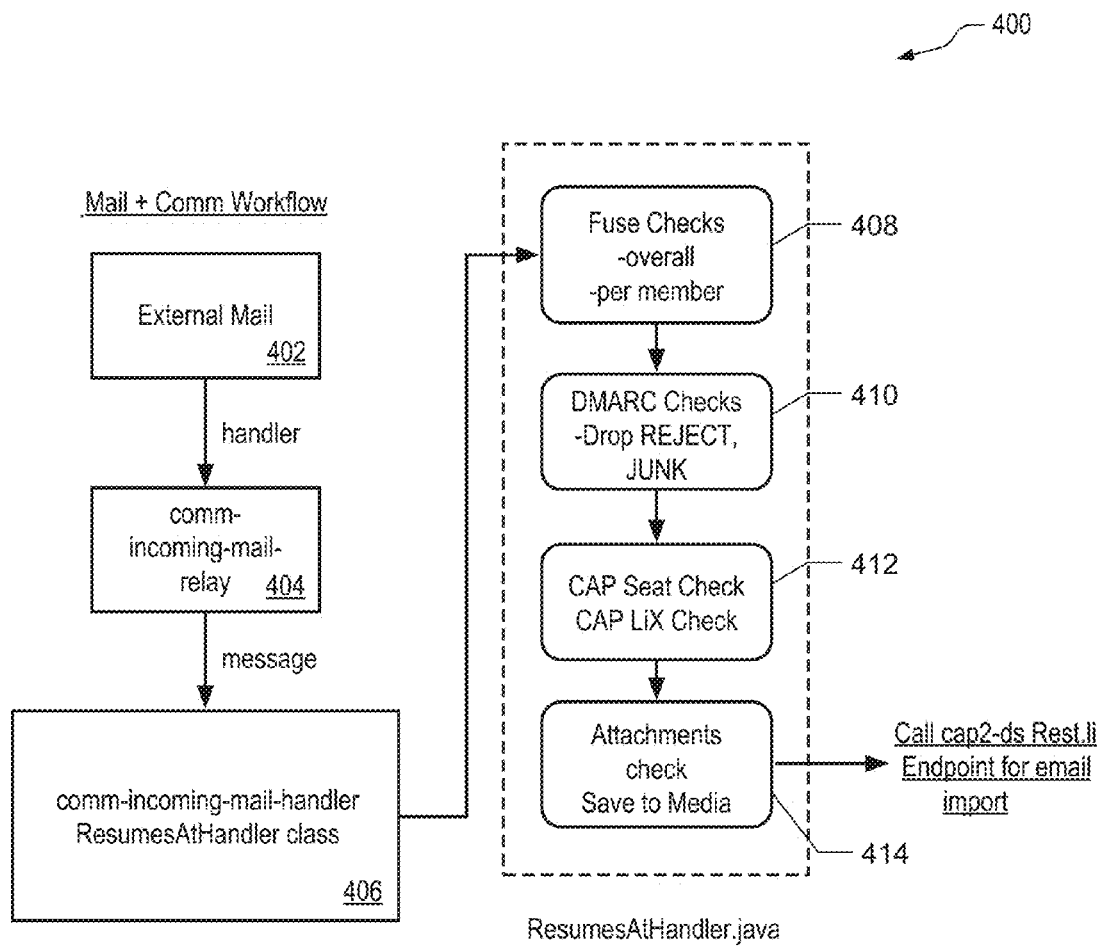
FIG. 4 is a flow chart illustrating example operations of a method of handling and relaying incoming email messages containing data items pertaining to potential job candidates.

FIG. 4 is a flow chart illustrating example operations of a method 400 of handling and relaying incoming email messages containing data items pertaining to potential job candidates. In various embodiments, the method 400 may be implemented by one or more of the modules of FIGS. 2A and 2B. For example, in various embodiments, these operations may be performed by the communication module 260 and the CAP module 262.

For example, initial processing may be performed by the communication module 260. Users may send email messages including one or more data items, such as resume attachments, notes, and so on, to any of one or more predetermined email addresses (e.g., resumes@company.com). In various embodiments, the predetermined email addresses may include internationalized options, such as cv@company.com, curriculos@company.com, lebenslaefer@company.com, and so on. In various embodiments, one or more of the predetermined email addresses may include a contract identifier such that users may associate the email messages with particular licensing contracts that govern the users' use of the social-networking system. In various embodiments, one or more of the predetermined email addresses may take the following form: resumes.contract-id@company.com. For example, resumes.1000@company.com.

At 402, the email messages sent to the various predetermined email addresses may be gathered by a server process or handler and posted to an incoming relay file (e.g., comm-incoming-mail-relay-war).

At 404, the relay may then wrap the email messages for message brokering (e.g., in Apache Kafka messages) and pump them to a remailer (e.g., comm-incoming-mail-handler-war). The remailer may include pluggable classes for processing the incoming email message (e.g., "EmailActionHandler" classes).

At 406, one such custom class (e.g., ResumesAtHandler) may be wired to perform various initial processing operations, including implementing validation rules and storing resume attachments. In various embodiments, the number of incoming resumes and the number of attachments are tracked for accessing by the users.

At 408, a global rule limits the aggregate number of resumes and attachments that can be received (e.g., per hour and per day). In various embodiments, incoming email messages are dropped if the limit is exceeded. In various embodiments, a member-specific rule limits the number of resumes and attachments that can be received from a user (e.g., per hour and per day). These rules may help prevent Denial of Service (DOS) attacks. For example, look ups (e.g., related to matching user to contracts), media server writes (e.g., related to storing data items), and so on may be limited.

At 410, the email DMARC is examined, in various embodiments, if the DMARC has particular markings (e.g., FAIL+REJECT or FAIL+JUNK), it may be dropped. Otherwise, it may be allowed through. The DMARC may be examined again later by separate services (e.g., the CAP service). This initial pass may simply be looking for email messages that should typically be dropped based on the DMARC.

In various embodiments, the sender's email address may be examined. For example, in various embodiments, the email message may be dropped if the sender's email address does not correspond to a member of the social-networking service and a CAP seat (or license) holder.

At 412, a licensing test is performed. If the sender's CAP contract does not include a license for importing resumes, the email message may be dropped.

At 414, the attachments are examined. Resume attachments that are not in a supported file format for importing (e.g., PDF/DOC/DOCX) may be dropped. Otherwise, the attached resumes may be stored on a media server. In various embodiments, the communication module 260 may not mark the email messages for persistent storage. Thus, unless they are marked for persistent storage by another service, the email messages may be deleted by default within a time period (e.g., one week).

In various embodiments, the communication module 260, upon completing the initial processing steps described above, may call an interface provided by a separate module (e.g., the CAP module 262) to initiate further processing of the email message.

Figure 5:
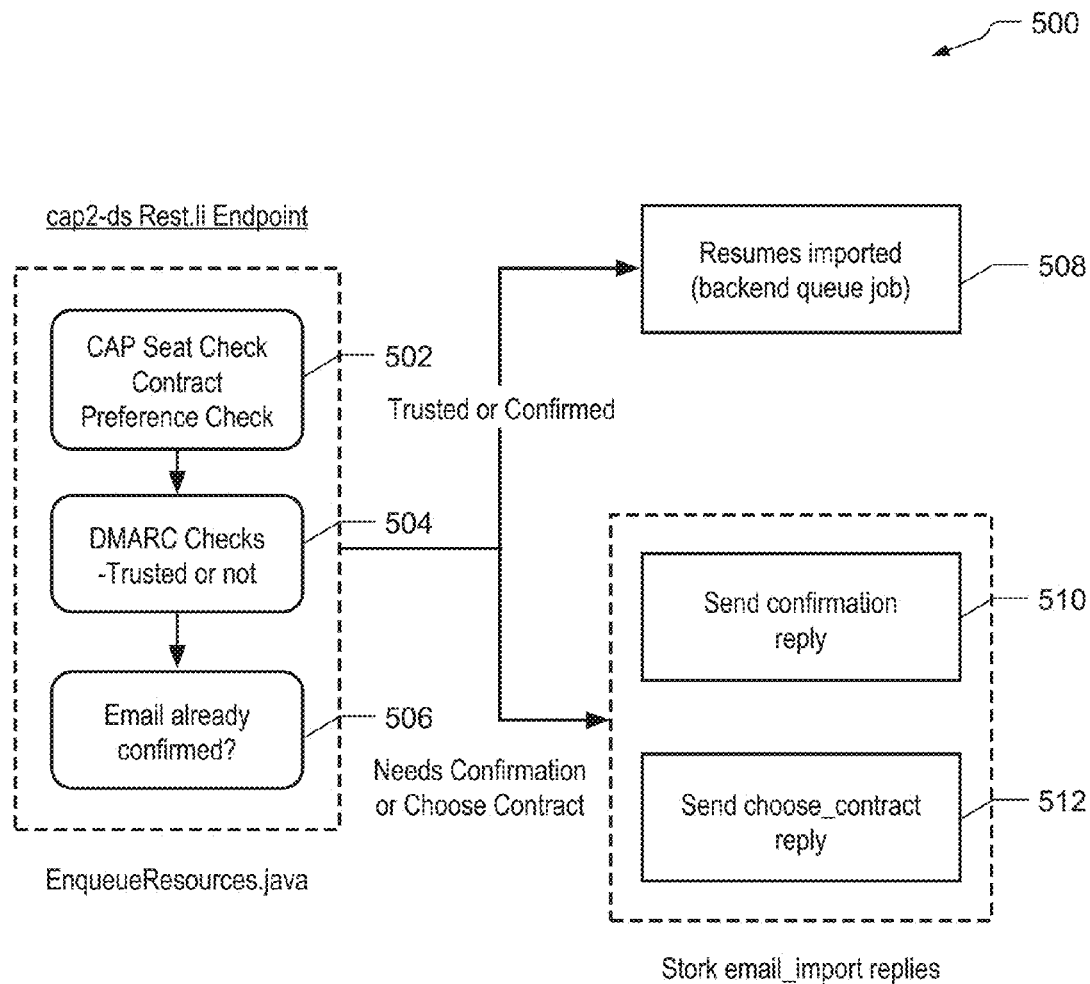
FIG. 5 is a flow chart illustrating example operations of a method of further processing of incoming email messages.

FIG. 5 is a flow chart illustrating example operations of a method 500 of further processing of incoming email messages. In various embodiments, the method 500 may be implemented by one or more of the modules of FIGS. 2A and 2B. For example, in various embodiments, the CAP module 262 may perform operations including importing of the email messages and generating and processing of reply messages.

At 502, the CAP module 262 may recheck that the user has an active CAP seat on an active CAP contract. Additionally, the CAP module 262 may confirm that the user has certain access rights (e.g., "add prospect" permissions). In various embodiments, seats may be filtered out where a relevant contract preference (e.g., "Email_Import_Enabled") is set to false. If there are no candidate seats, the email may be dropped. If the user has valid seats on more than one contract, the user may be sent a "choose_contract" reply message (see, e.g., FIG. 12). If the email is unreadable or does not include resume attachments, the user may be provided with an "invalid" reply message. In various embodiments, the email importing feature will be supported for various seat types, including sourcer, admin, job manager, and talent pipeline only seat types. In various embodiments, the email importing feature will be supported for various contract types, including corporate recruiter, RPS2, research, and recruiter small business contract types.

At 504, the DMARC may be rechecked. If the DMARC is trusted (and an associated configuration option is enabled to trust the DMARC), the data items included in the email messages may be imported and stored on the media server. Additionally, the stored content may be marked as persistent.

If the DMARC is not trusted, a configuration parameter or database entry (e.g., CAP.EMAIL_IMPORT_CONFIRMATIONS) may be checked to see if the user has confirmed the email in the last two weeks. If so, at 508, the import may be run (e.g., as a backend queue job). If not, the user may be sent a "confirm" reply message.

At 510, users may be sent one of three reply emails: "invalid", "confirm" or, at 512, "choose_contract" (which may also request that the user confirm the email). There are no actions to take on an "invalid" reply, but "confirm" and "choose_contract" both include links that may trigger the import, as long as the links are clicked within a particular time period (e.g., 48 hours after the reply is sent).

Figure 6:
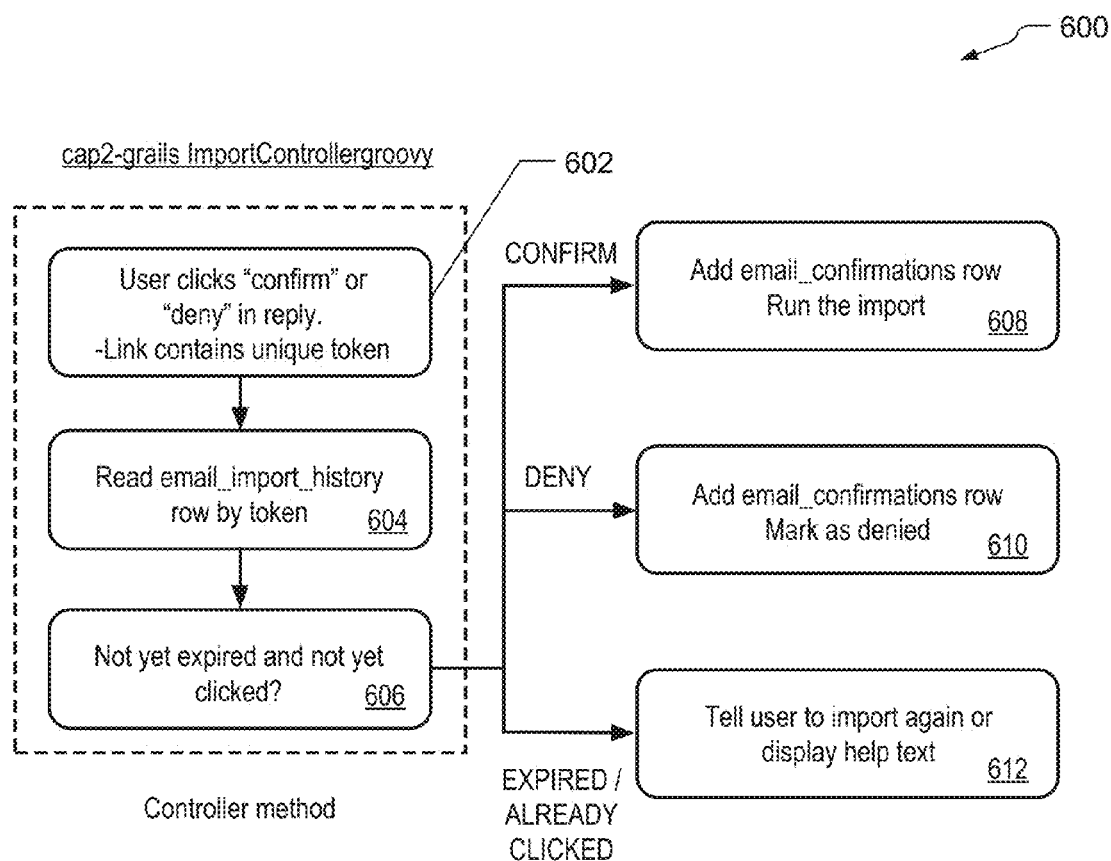
FIG. 6 is a flow chart illustrating example operations of a method of confirming processing of incoming email messages.

FIG. 6 is a flow chart illustrating example operations of a method 600 of confirming processing of incoming email messages. In various embodiments, the method 600 may be implemented by one or more of the modules of FIGS. 2A and 2B.

At 602, the user is prompted to confirm or deny the importing of the email message. In various embodiments, for the links, a URL may be generated with a unique token at the end, (e.g., www.company.com/cap/import/confirmEmailImport?token=abcde&action=CONFIRM&hash=1234. The token may be a standard UUID. The URL may remain valid for a particular time period (e.g., up to 48 hour)s. In various embodiments, a hash may be included at the end that is a hash of a generated URL. In this way, the validity of the URL may be verified without having to query a database for a row matching the token.

At 604, the email import history (e.g., the email_import_history row of the database) is read based on the received token.

At 608, if the "confirm" link is clicked, a row may be added or modified in a database table (e.g., a CAP.EMAIL_IMPORT_CONFIRMATIONS table) to reflect the confirmation. In various embodiments, the confirmation may expire in a particular time period (e.g., two weeks). In various embodiments, a message will be sent to the user that their email import was confirmed and the user will be given a link to a preview page. In various embodiments, the user may be able to watch the import in real time on the preview page.

At 610, if the "deny" link is clicked, a row of the database record (e.g., an email_confirmations row) may be added or modified to reflect the denial.

At 612, if a previous confirmation has expired, the user may be notified to reimport the email message.

A database schema associated with the CAP module 262 may include a first table for tracking the email import history (a CAP.EMAIL_IMPORT_CONFIRMATIONS table) and a second table for tracking email confirmations (e.g., CAP.EMAIL_CONFIRMATIONS). Such tables may include a preference or a row (e.g., email_import_enabled) that specifies whether importing of email messages is enabled across a contract. Additionally, the schema may include records for keeping keep track of email import requests, including information about the email, replies sent, actions the user took on the reply, import information, and run time exceptions. Additionally, the schema may include records for keeping track of email address verifications that have been confirmed or denied by users.

For example, the email import history table may include any of the following rows or preferences (or similar), by name, data type, and description:

email_import_id (number): primary key
from_member_id (number): sender's member id
from_email_addr (varchar2(100)): sender's email address (e.g., lowercase)
sent_time (date): date the email was originally sent
header_names (varchar2(4000)): json list of email header names
header_values (varchar2(4000)): json list of email header values
unique_token (varchar2(100)): unique authentication token embedded in the reply link
reply_type (varchar2(100)): 'non_dmarc_pass', 'non_prev_confirm', 'invalid', 'confirm', 'choose_contract'
reply_action (varchar2(100)): 'confirm', 'deny', 'choose_contract', 'expired'
action_time (date): date the user took action on the reply we sent them
expire_time (date): if the email needs confirmation, date at which it expires and the user can no longer confirm
import_req_id (number: import request id when we import
contract_id (number): contract id on which the import happens
seat_id (number): seat id of the member on the contract on which the import happsn Additionally, the email confirmations table may include any of the following rows or preferences (or similar), by name, data type, and description:

confirmation_id (number): primary key
member_id (number): member id for the member confirming the email address
member_email (varchar2(100)): member email address being confirmed (e.g., lowercase)
action (varchar2(100)): 'confirm', 'deny'
action_time (date): date the user took the action to confirm or deny FIG. 7 is a line drawing illustrating an example user interface for notifying a user of the option to use the email importing feature. In various embodiments, the user interface may be implemented by one or more of the modules of FIGS. 2A and 2B. For example, in various embodiments, the user interface may be generated by the profile annotation module(s) 120 and presented via the user interface module 206. In various embodiments, the user may be notified via a "tip" email. The user interface may differ depending on whether the user's contract is activated to support the mail importing feature. In this example, the user's contract is activated. If the user's contract was not activated, the message would likely be a marketing message suggesting that the user activate the feature.

FIG. 8 is a line drawing illustrating an example user interface for allowing a user to forward an email message to a predetermined email address to trigger an importing of data items included in the email message. In various embodiments, the email message may include a candidate's resume as an attachment (or resumes of multiple candidates), accompanying remarks provided by the candidate(s), originating email address of candidate(s), additional notes added by the user (e.g., the job recruiter), additional non-resume attachments, and so on.

In various embodiments, users may specify metadata (e.g., in the subject line of the message). For example, to associate a potential job candidate with a tag, the user may include a number sign ("#") followed by the tag's name. The user may do this for multiple tags. For example, the user may specify a subject having the format "<SUBJECT>#tag1 #tag2". Furthermore, to associate a project with a potential job candidate, the user may specify an at-sign ("@") followed by the project value. Additionally, to associate a source with a potential job candidate, the user may specify "<TBD>" followed by the source value.

Figure 9:
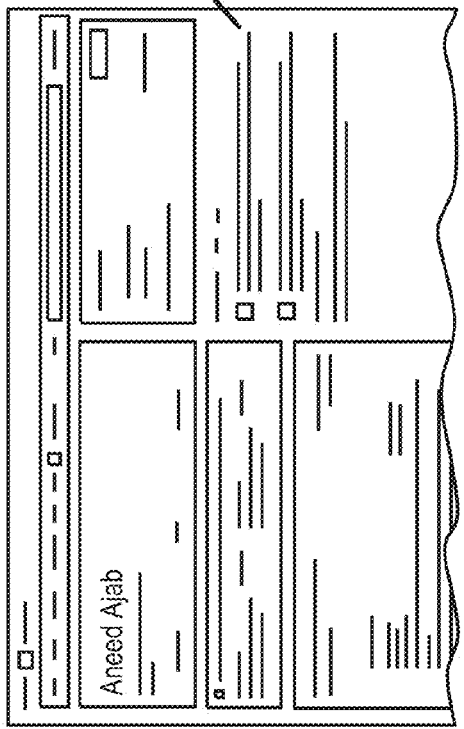
FIG. 9 is a line drawing illustrating an example user interface for providing a notification that data items included an email message were successfully imported.

FIG. 9 is a line drawing illustrating an example user interface for providing a notification that data items included in an email message were successfully imported. In this example, the notification appears in an activity feed on a profile of the potential job candidate. In various embodiments, job recruiters having seats on a same license may be presented with a similar shared feed showing updates associated with the license.

FIG. 10 is a line drawing illustrating an example user interface for notifying the sender that an email message was not successfully parsed and imported. In various embodiments, the user interface includes an "Add a profile" button. By clicking on this button, the user may manually add a private profile to track the potential job candidate. Later, if the potential candidate creates a public profile with respect to the social-networking system, the data in the private profile may be aggregated with the data in the public profile for presenting to associated users, as described above.

FIG. 11 is a line drawing illustrating an example user interface for notifying the sender that one or more of multiple data items (e.g., resume attachments) were not successfully processed. The user may then choose to add a private profile with which to associate the data.

FIG. 12 is a line drawing illustrating an example user interface for prompting the user to select from one of several contracts (e.g., when the email address of the user is associated with multiple contracts).

FIG. 13 is a line drawing illustrating an example user interface for prompting the user to select from one of several contracts for each of multiple data items (e.g., resume attachments) included in the email message.

Figure 14:
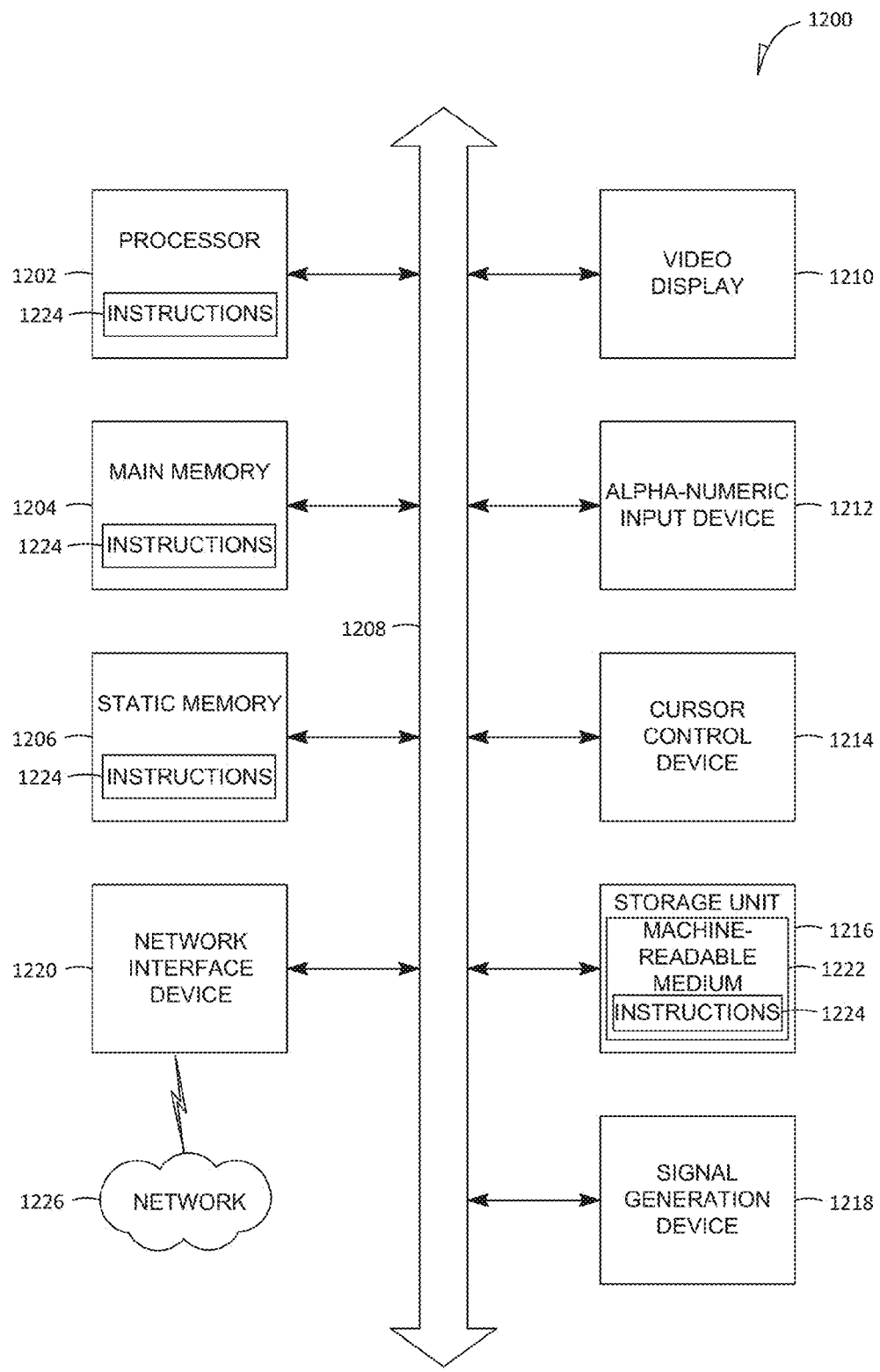
FIG. 14 is a block diagram of a machine in the example form of a computer system within which instructions for causing the machine to perform any one or more of the methodologies discussed herein may be executed.

FIG. 14 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit 1216, a signal generation device 1218 (e.g., a speaker and a network interface device 1220.

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium." may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The network 1226 may be one of the networks 1220. The instructions 1224 may be transmitted using the network interface device 1220 and any one of a number of well-known transfer protocols (e.g., Hyper Text Transfer Protocol (HTTP)). Examples of communication networks include a local area network. ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly; the specification and drawings are to be regarded in an illustrative rather than a restrictive sense. The accompanying drawings that form a part hereof, show by way of illustration, and not of imitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   incorporating one or more annotation modules into a social networking system, the one or more annotation modules configuring one or more processors of the social networking system to provide a job recruiter with access to a user interface that includes a private annotation of a public profile of a member of the social networking system, the providing of the job recruiter with the access including:
   receiving an email message from the job recruiter;
   identifying a data item included in the email message, the data item including an element of a resume;
   determining a correspondence between the data item included in the email message and the public profile of the member of the social-networking system based on a comparison between the data item included in the email message with data items included in the public profile of the member;
   storing an additional data item included in the email message in conjunction with the public profile of the member, the storing of the additional data item based on a determination that the additional data item is non-duplicative of the data items included in the public profile of the member, the additional data item being a private data item; and
   communicating an aggregation of the public data items and the private data item for accessing by the job recruiter in the user interface, the private data item represented as a private annotation of the public data items, the private data item viewable in the user interface by the job recruiter upon an accessing of the public profile of the member by the job recruiter.

2. The method of claim 1, wherein the receiving of the email message includes receiving the email message at a predetermined email address associated with the social-networking system and wherein the identifying, determining, and storing are based on the receiving of the email message at the predetermined email address.

3. The method of claim 2, wherein the identifying of the data item includes parsing the email address to identify that a type of the data item included in the email message corresponds to a type of one of the data items in the public profile of the member of the social-networking system.

4. The method of 1, further comprising storing the additional item such that the additional item is further accessible by additional users of the social-networking system having a predetermined relationship with the user.

5. The method of claim 4, wherein the predetermined relationship is that the user and the additional users of the social-networking system have a seat on a same license on which automatic email importing is enabled.

6. A system comprising:
   one or more computer processors and a memory;
   one or more annotation modules incorporated into a networked system, the one or more annotation modules configuring the one or more processors to provide a job recruiter with access to a user interface that includes a private annotation of a public profile of a member of the social networking system, the providing of the job recruiter with the access including:
   receiving an email message from the job recruiter;
   identifying a data item included in the email message, the data item including an element, of a resume;
   determining a correspondence between the data item included in the email message and the public profile of the member of the social-networking system based on a comparison between the data item included in the email message with data items included in the public profile of the member;
   storing an additional data item included in the email message in conjunction with the public profile of the member, the storing of the additional data item based on a determination that the additional data item is non-duplicative of the data items included in the public profile of the member, the additional data item being a private data item; and
   communicating an aggregation of the public data items and the private data item for accessing by the job recruiter in the user interface, the private data item represented as a private annotation of the public data items, the private data item viewable in the user interface by the job recruiter upon an accessing of the public profile of the member by the job recruiter.

7. The system of claim 6, wherein the receiving of the email message includes receiving the email message at a predetermined email address associated with the social-networking system and wherein the identifying, determining, and storing are based on the receiving of the email message at the predetermined email address.

8. The system of claim 7, wherein the identifying of the data item includes parsing the email address to identify that a type of the data item included in the email message corresponds to a type of one of the data items in the public profile of the member of the social-networking system.

9. The system of 6, the one or more modules further configured to store the additional item such that the additional item is further accessible by additional users of the social-networking system having a predetermined relationship with the user.

10. The system of claim 9, wherein the predetermined relationship is that the user and the additional users of the social-networking system have a seat on a same license on which automatic email importing is enabled.

11. A non-transitory machine-readable storage medium storing a set of instructions that, when incorporated into a social-networking system as one or more annotation modules, configures one or more computer processors of the social-networking system to perform operations to provide a job recruiter with access to a user interface that includes a private annotation of a public profile of a member of the social networking system, the operations comprising:

receiving an email message from the job recruiter;

identifying a data item included in the email message, the data item including an element of a resume;

determining a correspondence between the data item included in the email message and the public profile of the member of the social-networking system based on a comparison between the data item included in the email message with data items included in the public profile of the member;

storing an additional data item included in the email message in conjunction with the public profile of the member, the storing of the additional data item based on a determination that the additional data item is non-duplicative of the data items included in the public profile of the member, the additional data item being a private data item; and communicating an aggregation of the public data items and the private data item for accessing by the job recruiter in the user interface, the private data item represented as a private annotation of the public data items, the private data item viewable in the user interface by the job recruiter upon an accessing of the public profile of the member by the job recruiter.

12. The non-transitory machine-readable storage medium of claim 11, wherein the receiving of the email message includes receiving the email message at a predetermined email address associated with the social-networking system and wherein the identifying, determining, and storing are based on the receiving of the email message at the predetermined email address.

13. The non-transitory machine-readable storage medium of claim 12, wherein the identifying of the data item includes parsing the email address to identify that a type of the data item included in the email message corresponds to a type of one of the data items in the public profile of the member of the social-networking system.

14. The non-transitory machine-readable storage medium of claim 11, further comprising storing the additional item such that the additional item is further accessible by additional users of the social-networking system having a predetermined relationship with the user.

\* \* \* \* \*

UNITED STATES PATENT AND TRADEMARK OFFICE
CERTIFICATE OF CORRECTION

PATENT NO. : 9,722,959 B2  
APPLICATION NO. : 14/559773  
DATED : August 1, 2017  
INVENTOR(S) : Gune et al.

Page 1 of 1

It is certified that error appears in the above-identified patent and that said Letters Patent is hereby corrected as shown below:

In the Claims

In Column 14, Line 32, in Claim 4, after "of", insert --claim--

In Column 15, Line 16, in Claim 9, after "of", insert --claim--

Signed and Sealed this  
Tenth Day of March, 2020

Andrei Iancu  
*Director of the United States Patent and Trademark Office*